UNITED STATES PATENT OFFICE.

ARTHUR HOWE CARPENTER AND GILBERT ALBERT BAUMANN, OF SAWPIT, COLORADO, ASSIGNORS TO THE COLORADO VANADIUM CORPORATION, OF SAWPIT, COLORADO, A CORPORATION OF COLORADO.

METHOD OF TREATING VANADIUM ORES AND SOLUTIONS.

1,393,748.  Specification of Letters Patent.  Patented Oct. 18, 1921.

No Drawing.  Application filed May 13, 1920. Serial No. 381,187.

*To all whom it may concern:*

Be it known that we, ARTHUR HOWE CARPENTER, a citizen of the United States of America, and residing in Sawpit, in the county of San Miguel and State of Colorado, and GILBERT ALBERT BAUMANN, a citizen of the Republic of Switzerland, and residing in Sawpit, in the county of San Miguel and State of Colorado, have invented certain new and useful Improvements in Methods of Treating Vanadium Ores and Solutions, of which the following is a specification.

This invention relates to a process of treating solutions of vanadium salts to precipitate the vanadium, and aims to provide improvements therein.

The present invention provides a process whereby a good precipitation of an insoluble vanadium compound may be obtained from a solution of vanadium salts, and the solution consequently well exhausted of its vanadium content, especially with dilute solutions of the soluble vanadium salt.

It is well known that vanadium can be precipitated from alkaline solutions by rendering such solutions slightly acid, any mineral acid serving equally well.

Under proper conditions of concentration and temperature, this precipitation can be made so complete that only the merest trace of vanadium can be detected by the chemist in the filtrates from filter presses.

In practice, sulfuric acid is usually added in the necessary amount to a tank previously heated to boiling, usually by passing steam through the solution.

However, it is usually not possible to make this precipitation complete from dilute solutions of vanadium. A solution usually should contain sufficient of the vanadium salt to show on analysis at least 1.75 to 2% of vanadium pentoxid ($V_2O_5$) for satisfactory results, although solutions showing on analysis as little as six-tenths of one per cent. metallic vanadium have been successfully precipitated under plant conditions.

We have discovered that if instead of sulfuric acid, there is used a sulfate salt, such as an alkali metal acid sulfate, preferably acid sodium sulfate, the so-called "acid niter cake" of commerce, that solutions showing only one-half of one per cent. of metallic vanadium can be completely precipitated under plant conditions, practically all of the vanadium being exhausted from the filtrate.

To obtain this favorable precipitation with the alkali metal acid sulfate, it is important to minimize the amount of water introduced with the sulfate. The water, if the sulfate is first put into solution, should be proportional to the strength of the vanadium salt in the vanadium salt solution. It is preferable, however, to not dissolve the sulfate prior to adding it to the vanadium salt solution, but to add it to the vanadium salt solution in the solid or dry state. The pulverized "acid niter cake" of commerce, is the form in which the sulfate is preferably added.

One particular manner in which to carry out the process (although other methods will readily occur to those versed in the art) is to draw off from a reservoir into a precipitating tank (provided with proper agitating devices, and so arranged that dry live steam under pressure can be passed into the solution) a sufficient quantity of the solution containing sodium vanadate and other salts, such as sodium chlorid, etc., and alkaline in reaction. The solution is usually boiling hot, but if it is not, it can readily be brought to the boiling point by passing steam into the solution. A correct quantity of pulverized "acid niter cake" is weighed out, the quantity being easily calculated from the alkalinity of the solution, is added into the solution which is being constantly agitated by the steam and by mechanical agitators. Enough of the acid niter cake is added to bring the solution to the acid side. In a few moments after vigorous boiling and stirring, it will be found that the whole of the vanadium is precipitated as hydrated vanadic oxid, and that the filtrate will be practically free of vanadium.

What we claim is:—

1. A method of precipitating an insoluble compound of vanadium from a solution of vanadium salt, which comprises adding an alkali metal acid sulfate thereto.

2. A method of precipitating an insoluble compound of vanadium from a solution of vanadium salt, which comprises adding an alkali metal acid sulfate thereto, water used to dissolve the sulfate being inversely proportional to the strength of the vanadium salt solution in vanadium salts.

3. A method of precipitating an insoluble compound of vanadium from a solution of vanadium salt, which comprises adding an alkali metal acid sulfate thereto, said sulfate being added in dry form.

4. A method of precipitating an insoluble compound of vanadium from a solution of vanadium salts, which comprises adding sodium acid sulfate thereto.

5. A method of precipitating an insoluble compound of vanadium from a solution of vanadium salts, which comprises adding sodium acid sulfate thereto, water used to dissolve the sulfate being proportional to the strength of the vanadium salt solution in vanadium salts.

6. A method of precipitating an insoluble compound of vanadium from a solution of vanadium salts, which comprises adding sodium acid sulfate thereto, said sulfate being added in dry form.

In witness whereof we have hereunto signed our names.

ARTHUR HOWE CARPENTER.
GILBERT ALBERT BAUMANN.